United States Patent [19]
Markosian et al.

[11] 3,713,727
[45] Jan. 30, 1973

[54] SOLAR UNIT

[75] Inventors: Marlen Manukovich Markosian; Yakov Tigranovich Shermazanian; Grigory Paravonovich Kazanchian; Jury Vardkesovich Avakian; Albert Vartanovich Vartanian, all of Erevan, U.S.S.R.

[73] Assignee: Erevanskoe otdelenie Vsesojuznogo nauchno-issledovatelskogo proektno-konstruktorskogo i tekhnologicheskogo instituta kabelnoi promyshlennosti, Erevan, U.S.S.R.

[22] Filed: April 22, 1971

[21] Appl. No.: 136,521

[52] U.S. Cl..................................350/292, 126/271
[51] Int. Cl.................................................G02b 5/08
[58] Field of Search..........126/270, 271; 350/7, 292; 356/244, 180

[56] References Cited

UNITED STATES PATENTS

| 681,095 | 8/1901 | Baker | 350/292 |
| 3,551,062 | 7/1967 | Brown | 356/244 |

Primary Examiner—David Schonberg
Assistant Examiner—Michael J. Tokar
Attorney—Holman & Stern

[57] ABSTRACT

A solar unit comprising a solar energy concentrator with a reflecting surface made of flat facets, and a rotatable solar energy receiver disposed in a solar spot of said concentrator, test objects being mounted on said receiver. The solar energy receiver may be made in the form of a polyhedron or a disk.

3 Claims, 4 Drawing Figures

PATENTED JAN 30 1973

SOLAR UNIT

This invention relates to units for solar energy concentration and may find application for testing diverse objects under low and high-temperature conditions, particularly for carrying out light resistance tests.

There are known solar units incorporating a solar energy concentrator, such as, for example, a parabolic or cylindrical concentrator, whose reflecting surface consists of flat facets, and an energy receiver disposed in a focal spot of said concentrator and accommodating the test object.

These known solar units are disadvantageous in that they provide no possibility of subjecting diverse materials to simultaneous irradiation tests and also of testing diverse materials under different irradiation and temperature conditions.

It is an object of the present invention to provide a solar unit which will make possible the simultaneous tests of diverse materials by a pulse irradiation technique.

It is another object of the present invention to provide a solar unit which will make possible the tests of diverse materials simultaneously under dissimilar light and temperature conditions.

These objects are accomplished by the provision of a solar unit comprising a solar energy concentrator, whose reflecting surface is made of flat facets, and a solar energy receiver disposed in the focal spot of a concentrator and accommodating a test object, wherein the solar energy receiver, according to the invention, is made rotatable.

The solar energy receiver may be made in the form of a polyhedron whose faces consecutively traverse the focal spot of the concentrator, while the solar energy receiver is being rotated, test objects being mounted on said polyhedron faces.

The solar energy receiver, according to the invention, may further be made in the form of a disk arranged so that the surface of said disk is in partial coincidence with the focal spot of the concentrator, test objects being radially disposed on the disk surface.

The aforesaid embodiments of the solar energy receiver in the solar unit, according to the present invention, make it possible not only to accomplish the objects set forth hereinabove, but also to attain high reliability of test data and to minimize significantly the duration of tests.

The present invention is illustrated hereinbelow by the description of exemplary embodiments thereof with reference to the accompanying drawings, wherein FIG. 1 presents the general view of the solar unit, according to the invention;

The present solar unit consists of a parabolic concentrator 1 (FIG. 1) and a solar energy receiver 2, which is manufactured from a robust, heat-resisting material in the form of a rotatable polyhedron whose faces 3 traverse the solar spot of the concentrator 1.

In the concentrator 1, the reflecting surface is composed of separate flat facets 4 (FIG. 2), i.e. separate mirror elements, manufactured from polished sheet aluminum or some other suitable material capable of distortionless reflection of the sun light from the wavelength of 2,800–2,900 A upwards. The facets 4 are disposed on the concentrator surface in parallel rows at an angle in relation to the optical axis of the concentrator 1.

Figure 2:
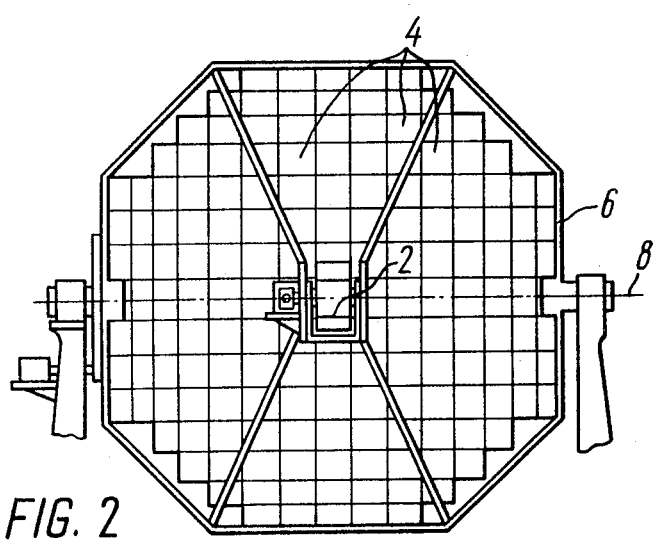
FIG. 2 shows the concentrator of the solar unit, according to the invention, as viewed in the direction of arrow A of FIG. 1.

The concentrator 1 is mounted in a rotatable frame 6. A drive 7 provides for a significant range of the concentrator rotation about an axis of the axle 8 (FIG. 2). The concentrator 1 is erected on a turntable 9, which rests on supports 10.

A drive 11 effects the azimuthal revolution of the concentrator 1 about an axis of rotation 12.

To set the solar energy receiver 2 in rotation, provision is made in the present solar unit for a drive 13.

Figure 3:
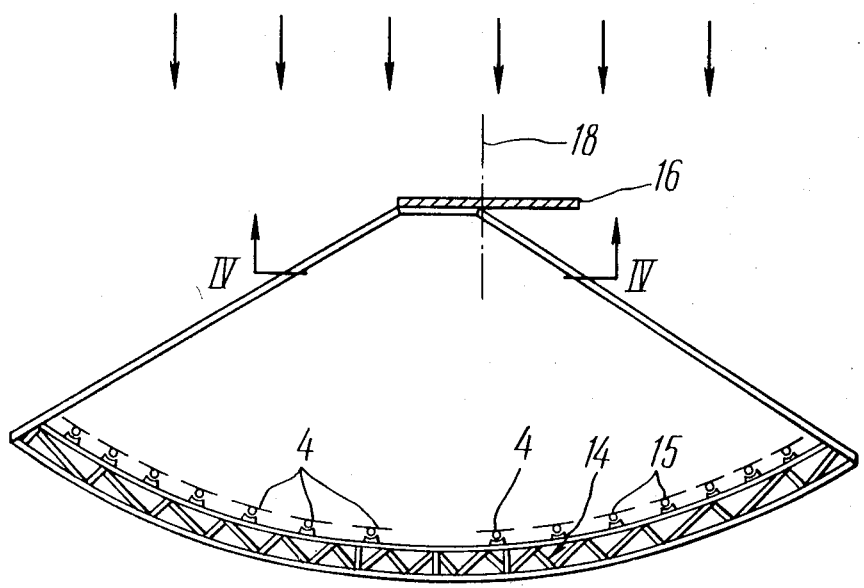
FIG. 3 is another modification of the solar energy receiver, according to the invention.

The concentrator 1 consists of a welded open-work structure 14 (FIG. 3), which carries the facets 4 mounted on hinges 15.

Figure 4:
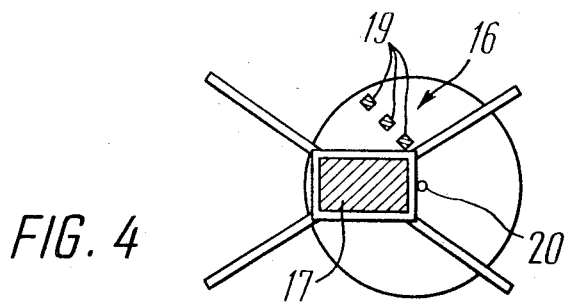
FIG. 4 presents the solar energy receiver of FIG. 3 in sectional view along the line IV—IV.

The solar energy receiver 2 may be made in the form of a disk 16 (FIG. 3), which is disposed so that the disk surface coincides in part with the focal spot 17 (FIG. 4) of the concentrator 1.

Figure 1:
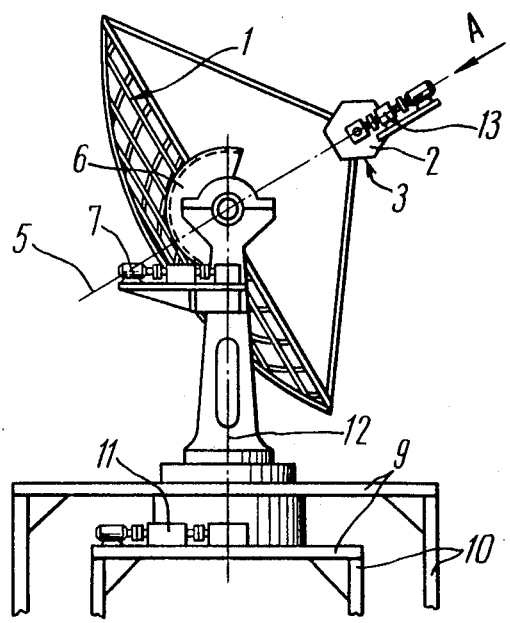

The disk 16 rotates about an axis 18 which is parallel to the optical axis 5 (FIG. 1).

In the preferred embodiment, the shape of square or rectangular facets 4 should totally or partially reproduce the shape of the illuminated surface of the solar energy receiver 2, further provision being made to decrease the size of the facets 4 in the direction from the center of the concentrator 1 to the concentrator periphery.

The illustrated solar unit functions as follows.

A sun tracking system automatically orients the solar unit so that the focal spot 17 invariably occupies the same position on the solar energy receiver 2.

The solar energy receiver 2 is rotated by means of the drive 13 is order to attain the desired light and temperature conditions for testing the objects 19, the latter being disposed on the surface of the faces 3 of a polyhedron or arranged radially on the surface of the disk 16 directed towards the concentrator 1.

The requisite combination of illumination and temperature conditions of tests is attained by varying the number for the faces 3 or the location of the test objects 19 on the disk 16 in relation to the axis 18 of disk rotation, or else by varying the position of the center 20 of rotation of the disk 16, as well as by varying the speed and mode of rotation of the solar energy receiver 2.

The aforesaid design of the solar energy concentrator provides for uniform illumination of the test objects with concentrated light, while the design of the solar energy receiver makes for irradiating the test materials with light pulses and also makes possible simultaneous investigation of diverse materials on one and the same solar unit.

We claim:

1. A solar unit for intermittently subjecting a test object to solar energy in the form of pulse radiation, comprising: a solar energy concentrator having a parabolic reflecting surface made of flat facets which concentrate solar energy as a beam in a focal spot of said parabolic reflecting surface; a rotatable solar energy receiver disposed substantially at said focal spot and supported by said energy concentrator; means extending from and supported by said energy concentrator for securingly supporting and holding said solar energy receiver at a fixed distance and disposition from said energy concentrator; means provided in said energy receiver for mounting a test object on said receiver in order to eradiate said test object intermittently with the concentrated solar energy; and a variable means of setting of said solar energy receiver in rotation for bringing said test object in line with said beam once every revolution of said receiver, whereby the test object may be exposed to a required frequency of pulse radiation by a suitable choice of the speed of rotation of said energy receiver.

2. A solar unit according to claim 1, wherein said solar energy receiver is made in the form of a rotatable polyhedron, each of whose faces, during rotation of the polyhedron, traverses successively said focal spot of said concentrator so as to be exposed successively to said beam, a plurality of test objects being mounted on the polyhedron on each face thereof.

3. A solar unit according to claim 1, wherein said solar energy receiver is made in the form of a disk whose surface is in partial coincidence with said focal spot of said concentrator, test objects being mounted on the surface of said disk at the periphery thereof so as to be exposed successively to said beam.

* * * * *